United States Patent [19]

Fischer et al.

[11] 4,392,203

[45] Jul. 5, 1983

[54] AIRCRAFT COORDINATED TURN WITH LAGGED ROLL RATE

[75] Inventors: William C. Fischer, Monroe; Don L. Adams, Fairfield; David J. Verzella, Guilford; Stuart C. Wright, Milford, all of Conn.

[73] Assignee: United Technologies Corporation, Hartford, Conn.

[21] Appl. No.: 249,273

[22] Filed: Mar. 30, 1981

[51] Int. Cl.³ .................. G06F 15/50; G06G 7/78
[52] U.S. Cl. .................. 364/434; 244/17.13; 244/177
[58] Field of Search .................. 364/434, 457; 244/17.13, 177, 178, 179, 184

[56] References Cited

U.S. PATENT DOCUMENTS

| | | | |
|---|---|---|---|
| 3,711,042 | 1/1973 | Rempfer et al. | 244/17.13 X |
| 3,812,333 | 5/1974 | Mineck et al. | 364/428 |
| 3,848,833 | 11/1974 | Rauschelbach | 364/434 X |
| 4,067,517 | 1/1978 | Barnum | 244/17.13 |
| 4,109,886 | 8/1978 | Tribken et al. | 364/434 X |
| 4,206,891 | 6/1980 | Perez et al. | 244/17.13 |

Primary Examiner—Jerry Smith
Attorney, Agent, or Firm—M. P. Williams

[57] ABSTRACT

An aircraft automatic flight control system having a roll channel (FIG. 1), a yaw outer loop trim system (bottom of FIG. 2) and a yaw stability inner loop (top of FIG. 2) provides proportional (129) and integral (114) lateral acceleration inputs to the yaw trim system (106, 93) during coordinated turns, and provides proportional (130) and lagged (131) roll rate inputs to the trim system to provide initial coordination to the turns.

2 Claims, 3 Drawing Figures

AIRCRAFT COORDINATED TURN WITH LAGGED ROLL RATE

DESCRIPTION

1. Technical Field

This invention relates to helicopters, and more particularly to improvements in systems for providing automatic coordinated turns.

2. Background Art

It has long been known that turning any vehicle at high speed in an uncoordinated fashion is uncomfortable for passengers and may even cause passengers or cargo to move in one direction or the other, either in response to centrifugal force or gravity. For instance, if an aircraft takes a sharp level turn by rotation in its yaw axis, the resultant force on passengers and cargo is essentially a sideways force radially outward from the center of the turn. On the other hand, if the aircraft makes a sharp bank angle and a nose up turn, with no rotation in the yaw axis, then the gravitational force will no longer be normal to the floor of the aircraft, and can literally slide passengers off the sides of their seats. A coordinated turn is one in which the net acceleration is in a direction normal to the floor of the aircraft. This is achieved by combining the desired amount of roll with a correct amount of yaw, as is well known in the art. Examples of systems that provide coordinated turns are U.S. Pat. Nos. 4,003,532, 4,067,517 and 4,206,891.

It is common at low airspeeds to utilize yaw to control the heading of the aircraft; but at high speeds, it is common to employ roll to effect a turn, utilizing yaw only to coordinate the turn. When entering a coordinated turn, a pilot may, for instance, place his feet on pedal switches on the yaw-controlling pedals of the aircraft. As the aircraft rolls is over from a wings level condition, roll rate is utilized to provide a yaw input to tend to coordinate the turn initially. In the steady state, proportional and integrated lateral acceleration is utilized to provide yaw inputs to coordinate the turn. In a turn of a constant speed and roll angle, once the lateral acceleration integrator output has reached the correct amount, the lateral acceleration becomes zero (since there is no sideways movement in a perfectly coordinated turn), and only integrated lateral acceleration retains a steady state value to coordinate the turn.

A problem can arise if the aircraft has nimble aerodynamic capabilities. If the aircraft rolls easily, the roll rate may disappear before the lateral acceleration integrator has built up sufficiently to coordinate the turn. In such a case, the turn then becomes uncoordinated until it has created sufficient lateral acceleration to build up the integrator output. Then it becomes coordinated again. Increasing the gain of the roll rate is no help when the roll rate simply disappears too quickly; increasing the gain of the lateral acceleration integration can cause oscillation about the coordination point.

Disclosure of Invention

Objects of the present invention include provision of improvements in establishing automatic coordinated turns in aircraft.

According to the present invention, the automatic yaw trim channel of an aircraft which provides automatic coordinated turns in response to integrated lateral acceleration and provides initial coordination of the turns in response to roll rate, is provided with a lagged roll rate input to delay the decay in roll rate input, until integrated lateral acceleration can build up sufficiently to coordinate the turn. According to the invention further, the lagged roll rate may have a time constant of on the order of several seconds.

The present invention accommodates the need for extended roll rate input to the yaw trim channel of a helicopter in establishing coordinated turns, without adversely affecting the long term stability response of the aircraft once the coordinated turn has been established.

The invention may be practiced in a variety of aircraft types, including fixed wing aircraft and helicopters, and may be implemented with analog, digital or computerized signal processing, utilizing apparatus and techniques which are readily available in the art, in the light of the teachings which follow hereinafter.

The foregoing and other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
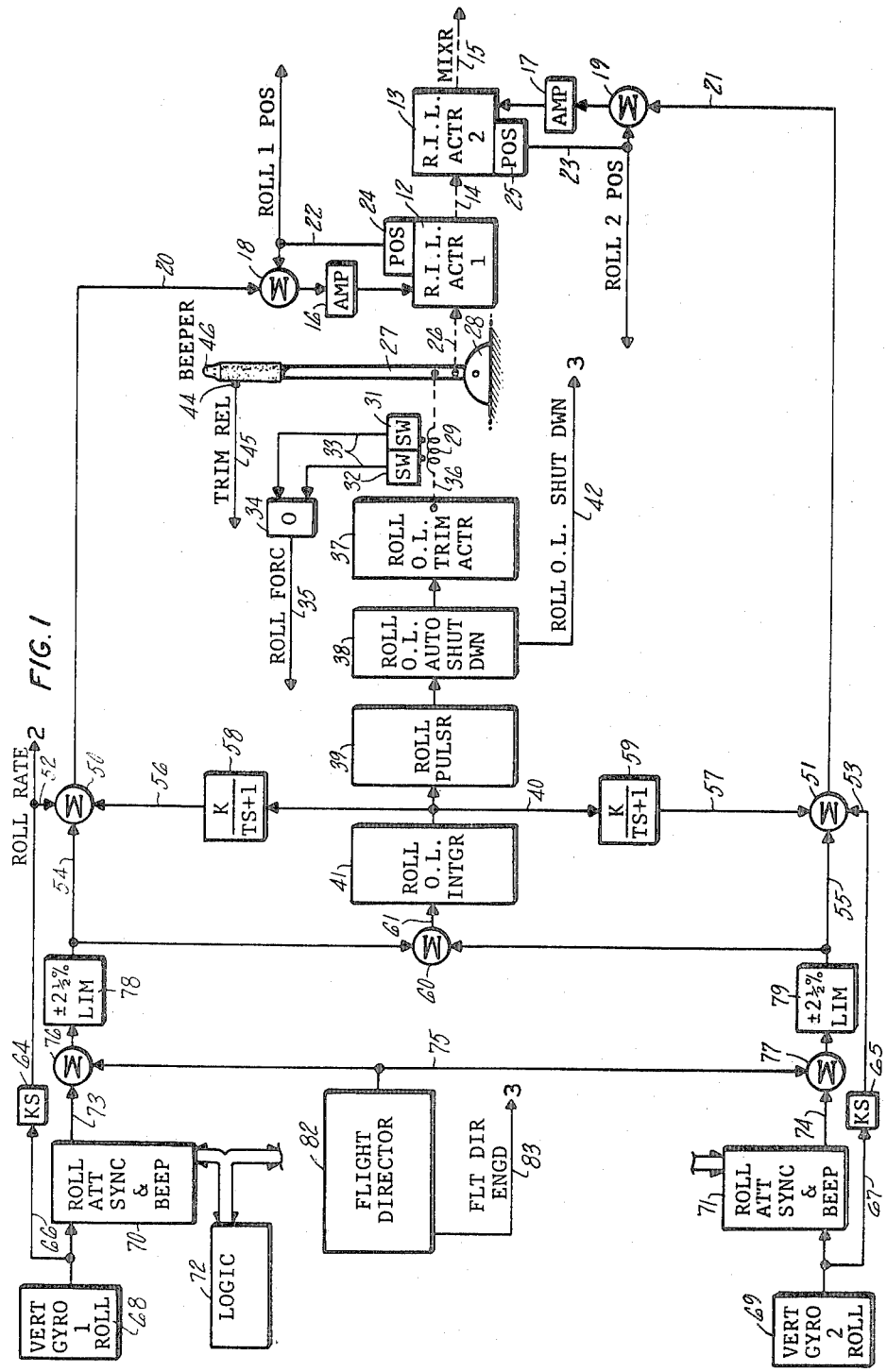
FIG. 1 is a simplified schematic block diagram of the roll channel of an automatic flight control system with which the present invention may be practiced.

Referring now to FIG. 1, a helicopter lateral cyclic pitch control system for controlling the roll axis attitude of a helicopter, with which the present invention may suitably be implemented, includes a pair of inner loop lateral cyclic pitch actuators 12, 13 which are connected together by suitable linkage 14 and to a main rotor blade roll angle swash plate mixer (not shown) by suitable linkage 15. Each of the actuators is driven by a corresponding amplifier 16, 17 in a nulling servo loop fashion. The amplifiers respond to error signals from corresponding summing junctions 18, 19 which provide the amplifiers with a signal indicative of the difference between a roll attitude command signal on a related line 20, 21 and a signal provided on a related line 22, 23 by a corresponding actuator position detector 24, 25 which is indicative of the achieved position of the actuator. When the actuators 12, 13 have achieved positions corresponding to the signals on the lines 20, 21 the error signal provided by the summing junctions 18, 19 to the amplifier 16, 17 goes to zero, so the actuators will remain at rest until the signals on the lines 20, 21 are changed.

The actuators 12, 13 are also connected by mechnical linkage 26 to a cyclic pitch control stick 27 which is pivoted within a gimbal 28 for right and left motion against the operation of a trim position spring 29. A pair of switches 31, 32 are disposed on the actuator 37 for detecting motion of the stick 27 against the spring 29 in respective directions. Closure of either switch 31, 32 will provide a signal on a corresponding one of two lines 33 to cause an OR circuit 34 to provide a roll force signal on a line 35. In various embodiments, the OR function provided by the circuit 34 may simply be implemented by the relationship of the switches 31, 32, as is known in the art.

The cyclic pitch stick 27 is connected by mechnical linkage 36 to a roll outer loop trim actuator 37 which is driven through roll outer loop automatic shutdown circuits 38 and roll pulser circuits 39 by a signal on a line 40 provided by a roller outer loop integrator circuit 41. These circuits, which are described in detail in a commonly owned copending U.S. patent application entitled PULSED AIRCRAFT ACTUATOR, Ser. No. 249,300, filed Mar. 30, 1981 by Fischer et al, serve to reposition the cyclic pitch stick 27 to a position indicative of the actual commands being provided by the linkage 15 as a consequence of motion of the actuators 12, 13. The roll auto shutdown circuit 38 provides a roll outer loop shutdown signal on a line 42. The cyclic pitch stick 27 has a switch 44 that can be closed by a thumb or finger so as to provide a trim release signal on a line 45. The stick 27 also has a "coolee hat" type of four-axis beeper switch 46 that can be moved right or left (or forward or aft) to provide beep signals; in a system of the type described, the beep signals are signals which allow slow automatic changes in the roll attitude reference signals.

The roll attitude command signals on the lines 20, 21 are each provided by a corresponding summing junction 50, 51, which sum together corresponding roll rate signals on lines 52, 53, roll attitude signals on lines 54, 55 and outer loop compensation signals on lines 56, 57. The outer loop compensation signals are provided by lagging amplifiers 58, 59 from the output of the roll outer loop integrator on the line 40. The roller attitude signals on the lines 54 and 55 are applied to a summing junction 60, the output of which is applied to the roll outer loop integrator 41 on a line 61.

The roll rate signals on the lines 52, 53 are provided by differentiators 64, 65 from gyro roll axis signals on lines 66, 67 which are provided by the roll axis outputs of corresponding vertical gyros 68, 69. The signals on the lines 66, 67 are also compared with attitude reference signals in roll attitude synchronizing and beep circuitry 70, 71. When the circuits 70, 71 are synchronized, the reference follows (is made equal to) the signal on the corresponding lines 66, 67 indicative of actual roll angle of the helicopter; when beeping is employed, the reference is forced to equal a greater or lesser roll angle; when the circuits 70, 71 are not synchronized, they provide roll error signals on related lines 73, 74 indicative of the variance between the actual roll angle of the helicopter and the desired helicopter roll attitude. Logic circuits 72 are connected with the roll attitude synch and beep circuits 70, 71 to control the operation thereof. In systems of the type disclosed herein, the signals on the lines 73, 74 are summed with an autosteering signal on a line 75 in corresponding summing junctions 76, 77, the resultant of which is applied to a related limiter circuit 78, 79 so as to provide the roll attitude signals on the lines 54, 55 limited to 2½% of total pilot authority. Thus the long term roll attitude control which can be provided by means of the actuators 12, 13 is limited to ±5% (total, 10%) of total pilot authority.

The autosteering signal on the line 75 may be provided by a flight director 82. This steers the helicopter automatically by providing a desired roll command for a necessary turn (such as to change course to a navigation waypoint). Whenever the flight director is engaged, it provides a signal indication thereof to the yaw channel on a line 83. This eliminates the heading hold function of the yaw channel outer loop and, if above 60 knots, invokes coordinated turn assistance from the yaw channel, as described with respect to FIGS. 2 and 3 hereinafter.

Figure 2:
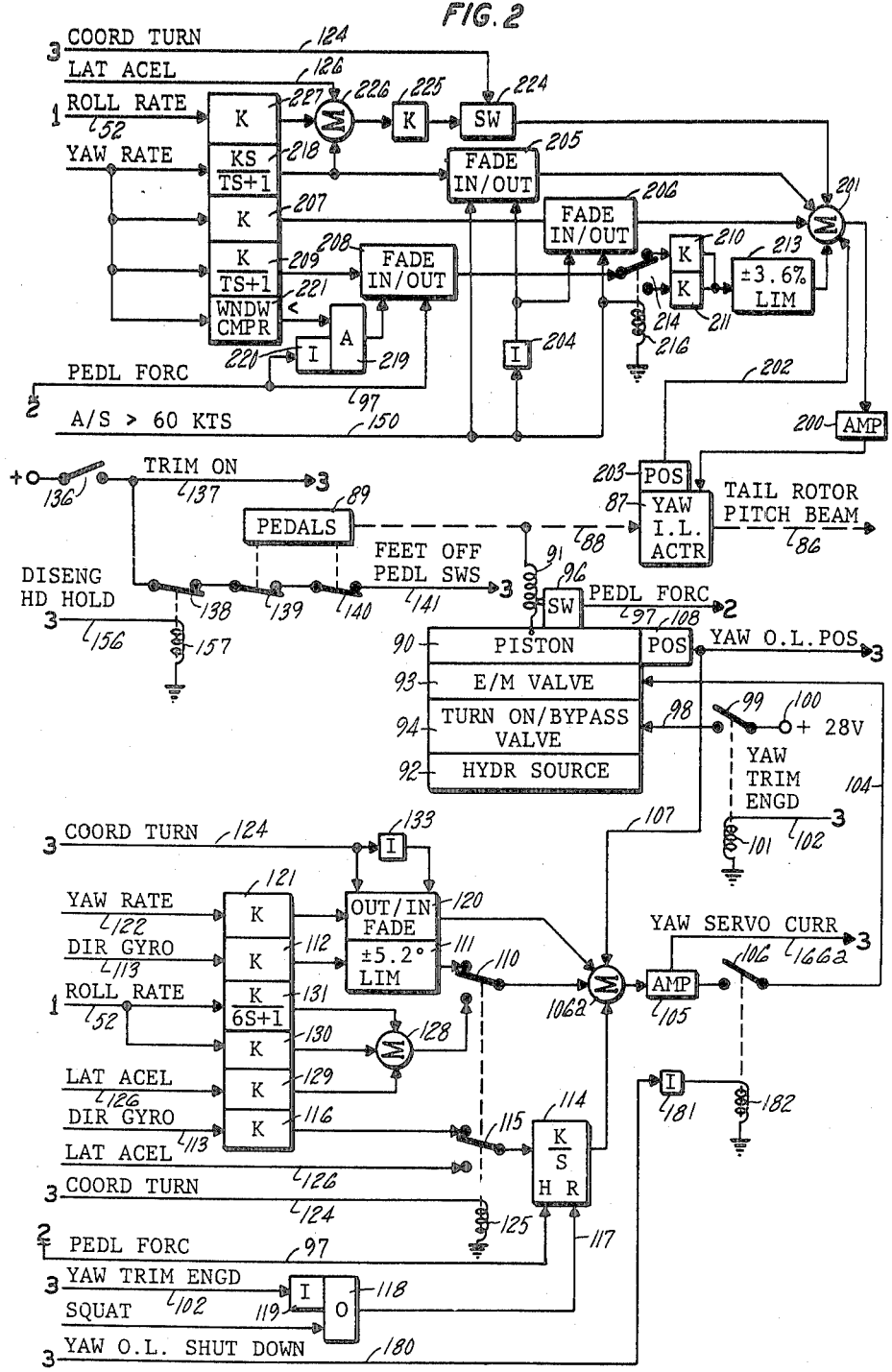
FIG. 2 is a simplified schematic block diagram of an aircraft yaw control channel including a yaw outer loop having automatic trim and an automatic yaw inner loop stability system.

Referring now to FIG. 2, the yaw axis of the helicopter is controlled by a mechanical linkage 86 which adjusts the position of the tail rotor pitch beam, to control the pitch angle of the tail rotor blades, and therefore the variation in yaw thrust. With no yaw axis control inputs thereto, the tail rotor pitch beam is adjusted so as to provide basic, anti-rotation stabilization of the aircraft as a function of main rotor speed and collective pitch. The position of the linkage 86 may be quickly adjusted, through some small percent (±10%) of the total yaw channel authority, by an inner loop actuator 87 which is connected in series between the linkage 86 and the outer loop linkage 88 to which the pilot pedals 89 (and usually a set of copilot pedals, not shown) are connected. The outer loop linkage 88 is resiliently connected to a complex, outer loop hydraulic actuator, which includes a resilient connection between the outer loop linkage 88 and a hydraulic piston 90 by means of a spring 91. The piston 90 may be driven in either direction by hydraulic fluid under pressure from a source 92 under the control of an electromagnetic valve 93 whenever a turn on/bypass valve 94 is operated so as to turn on the yaw trim engage function. When the turn on/bypass valve 94 is not operated, the opposite ends of the piston are interconnected through a bypass orifice that causes the piston to act as a fluid damper through the spring 91 to the outer loop linkage 88. Thus, when the pilot is flying the aircraft strictly by the pedals, the yaw channel outer loop will be hydraulically damped. As is conventional, the yaw outer loop provides relatively slow control over 100% of the authority of the yaw channel (the full authority of the pedals 89) for long term flight path control of the helicopter. The outer loop includes the pedals 89 and the control over the linkage 88 by the piston 90. If the piston 90 adjusts the position of the linkage 88 through spring 91, the pedals 89 will move commensurately. But, if the pilot desires to override the operation of the piston, by application of sufficient force, the pilot can overcome the spring 91 and cause motion of the linkage 88 to be different than that commanded by the piston 90. When this occurs, a tine on a switch 96 will sense the contraction or expansion of the spring 91 and provide a pedal force signal on a line 97. The control over the yaw axis in response to the piston 90 is referred to as yaw trim, and is effective when the turn on/bypass valve 94 is moved into the ON state (such as by a solenoid) in response to a turn on signal on the line 98 which may be made through a normally open contact 99 connected to a suitable voltage source 100. This will occur when a relay coil 101 is energized by a yaw trim engaged signal on a line 102. The yaw trim may be engaged at any speed. Above a cruise speed, such as 60 knots, it will provide either the heading hold function (steering the aircraft in accordance with inputs from a directional gyro) or a coordinated turn function. In coordinated turns, the trim system provides a yaw input so that a turn induced by rolling the aircraft in response to lateral movement of the cyclic pitch stick will have net acceleration, including gravity and centrifugal force, which is normal to the floor of the aircraft. Below the 60 knots, the yaw trim only provides heading hold; the yaw trim system can be disengaged below 60 knots by means of pedal switches, by the pilot turning trim off, or by automatically shutting down, as described hereinafter.

The yaw inner loop actuator 87 may comprise a relatively high speed electric jackscrew type of actuator. It is adjusted to move the linkage 86 without movement of the linkage 88, and thereby adds or subtracts from the pitch input provided by the linkage 88, without moving the pedals 89 or imposing a force on the spring 91. It is therefore invisible to the pilot. The yaw inner loop is normally engaged at all airspeeds and in all modes of operation, provided only that the pilot close a stability augmentation system engage switch (not shown). The function of the yaw inner loop is to provide very fast response over limited authority (such as ±10% of the full yaw authority), to short term disturbances to the airframe stability, such as is caused by wind gusts and the like, or by rapid pilot input commands (which the inner loop smooths somewhat).

When trim is engaged by closure of the contact 99, the piston 90 and therefore the linkage 88 is controlled by the electromagnetic valve 93 in response to a yaw trim error signal on a line 104 which is supplied by a servo amplifier 105 provided that automatic shutdown has not occurred so that a contact 106 is closed. The amplifier 105 derives its input from a summing junction 106a which receives a yaw outer loop position signal on a line 107 from a position sensor 108, that senses the position of the piston 90 and provides that as feedback, so that the amplifier 105 will drive the piston 90 until the yaw trim error signal on the line 104 is nil. Because the piston 90 remains at rest whenever yaw trim is not engaged, disengaging yaw trim may also de-clutch the position sensor 108 so that when yaw trim is again engaged, it will re-clutch to the current position of the piston (should the piston be moved in its damped mode by the pedals 89 in the meantime).

Considering first the heading hold function of yaw trim, the summing junction 106a is connected to a proportional direction gyro path through a contact 110 which, when in the normally closed position as shown, is connected to a ±5.2° limiter 111 which is fed by an amplifier 112 that is connected to the directional gyro output signal on a line 113. This path provides limited, proportional inputs to the trim system. The summing junction 106a is also connected to an integrating amplifier 114 which is connected through a normally closed contact 115 to an amplifier 116 that is also driven by the directional gyro output signal on the line 113. The integrator 114 is reset by a signal on a line 117 in response to an OR circuit 118 and an inverter 119 whenever yaw trim is not engaged as indicated by the absence of a signal on the line 102. The summing junction 106a is also responsive to a fade circuit 120 which, when in the heading hold mode, is faded in (a gain of unity). Therefore, the summing junction will be responsive to the output of an amplifier 121 which is responsive to a yaw rate signal on a line 122 provided by a yaw rate gyro which is responsive only to angular rates about the vertical centroid of the airframe.

Thus in the heading hold mode, the yaw trim system is responsive to integral and limited proportional directional gyro inputs, and is provided dynamic damping in response to yaw rate.

When the yaw trim system is engaged and the aircraft is flying above 60 knots, the pilot can transfer into the coordinated turn mode by depressing one of the pedal switches, in a manner described hereinafter. Similarly, the trim system can be maintained in the coordinated turn mode whenever an autosteering device, such as the flight director 82 (FIG. 1) is engaged, as described hereinafter. When in the coordinated turn mode, a coordinated turn signal on a line 124 (near bottom, FIG. 2) can operate a relay coil 125 to cause the contacts 110, 115 to transfer to the lower, normally open poles. The contact 115 will thereby cause the input of the integrator 114 to be connected to a filtered lateral acceleration signal on a line 126; the integrator is not reset, but control of its output becomes responsive to lateral acceleration (side slip). In a perfectly coordinated turn, there is no side slip so the lateral acceleration signal on the line 126 is nil, and the output of the integrator 114 remains constant. The constant output of the integrator 114, in the long term of a perfectly coordinated turn, is the right amount of yaw input so that the net acceleration is normal to the floor of the aircraft. The contact 110 will connect the summing junction 106a to a summing junction 128 which is responsive, inter alia, to an amplifier 129 connected to the lateral acceleration signal on the line 126. Thus, the amplifier 129 and integrator 114 provide proportional and integral lateral acceleration input for long term turn coordination.

When commencing a turn, it is common to introduce some roll rate into the yaw trim channel to build up a yaw input rapidly, as the airframe rolls over. Therefore, the summing junction 128 is also responsive to an amplifier 130 which is responsive to the roll rate signal on the line 52. The roll rate provides an initial high input that tends to overcome movement thresholds of the outer loop linkage 88 and pedals 89. The amount of roll rate (gain of the amplifier 130 in contrast with the rest of the trim system) is normally selected so as to nearly coordinate the turn initially, during which some lateral acceleration exists, whereby there will be a signal on the line 126 to cause the integrator 114 to integrate to an output which will tend to keep the turn coordinated, once the roll rate goes to zero (the airframe is rolled to the desired angle for the turn). However, depending upon airframe aerodynamic characteristics, the roll rate may disappear before the integrator 114 has built up a desired output to provide long term turn coordination. If this is the case, the only way that the integrator 114 can build up the desired output is for there to be lateral acceleration, which is felt as a sideways motion by the pilots and passengers. Increasing the gain of the lateral acceleration inputs to the point where this problem is corrected results in a very bumpy (proportional) and oscillatory (integral) coordinated turn. To overcome this difficulty, in any case where the roll rate goes to zero before the lateral acceleration integrator can build up sufficiently so as to coordinate the turn, lagged roll rate may be provided to the summing junction 128 through a lag amplifier 131 which may be provided with a very large time constant, such as on the order of six seconds. The roll rate itself through the amplifier 130 coordinates the turn through a substantial portion of the initial roll over, and the lag roll rate through the lag amplifier 131 provides coordination assistance during the final portion and just beyond completion of rolling to the desired bank angle, thereby to keep the turn nearly coordinated so that the output of the integrator 114 will build up to the point where its output will perfectly coordinate the turn without any further lateral acceleration (in the general steady state).

Because a coordinated turn does provide substantial yaw rates, the fade circuit 120 is caused to fade out in response to the coordinated turn signal on the line 124. The fade circuit 120 may comprise an amplifier having input resistances equivalent to stepped gains of from zero to one in sixteen steps, the different resistors being selected by means of a multiplexer circuit which is driven in response to an up/down counter stepped by a clock of a suitable frequency. Thus, when depressing a pedal which is to engage the coordinated turn, the gain of the fade circuit 120 can be quickly stepped from one to zero to avoid a disruptive input to the summing junction 106a. When the coordinated turn mode is ended, the absence of the signal on the line 124 will cause an inverter 133 to command the fade circuit 120 to fade back in, thus restoring yaw rate dynamic damping for heading hold.

Control over the yaw outer loop trim system is first of all responsive to whether or not the pilot wants the trim system on. If so, he can close a switch 136 (middle left of FIG. 2) to provide a trim on signal on a line 137. In FIG. 2, this is passed through a normally closed automatic heading hold disengaged contact 138, and pedal switches 139, 140 which are operable by the pilot pressing either a right or left pedal in the vicinity of the switch. If all of these switches and contacts are closed, there will be a feet off pedal switches signal on a line 141.

Figure 3:
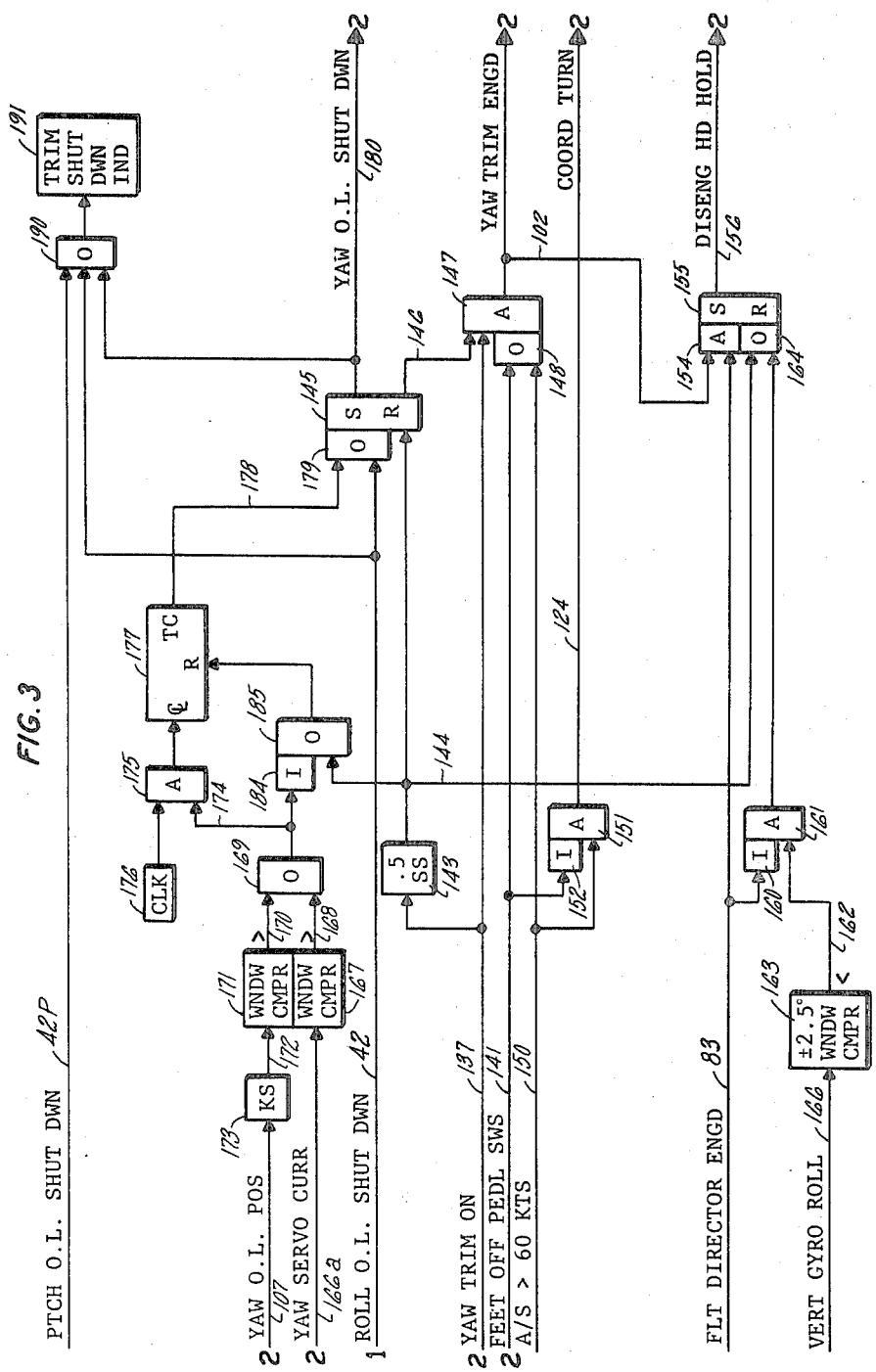
FIG. 3 is a simplified schematic block diagram of circuits providing control signals related to the system of FIGS. 1 and 2.

In FIG. 3, the yaw trim on signal, on the line 137, will cause a signal shot 143 to provide a trim on reset signal on a line 144 which will reset a yaw outer loop automatic shutdown bistable device 145, which therefore will provide a signal on a line 146 to an AND circuit 147. If the pilot has his feet off the pedals, there will be signal on the line 141 so that an OR circuit 148, along with the signals on the lines 137, 146, will operate the AND circuit 147 to provide the yaw trim engage signal on the line 102. If the aircraft is flying above 60 knots, as indicated by a signal on a line 150 (which may be generated simply in response to a pitot-static airspeed system signal being fed through a comparator, in a well known way, not shown), then even if the pilot does press the pedal switches so that the signal on the line 141 disappears, the OR circuit 148 will continue to drive the AND circuit 147 so that the yaw trim engage signal will remain present on the line 102. The coordinated turn signal on the line 124 is generated by an AND circuit 151 whenever airspeed is greater than 60 knots as indicated by the signal on the line 150 and the pilot has pressed the pedals as indicated by the absence of a signal on the line 141 which causes an inverter 152 to operate the AND circuit 151. As described hereinbefore, the presence of the coordinated turn signal leaves the yaw trim engaged but simply transfers from the heading hold mode to the coordinated turn mode. If the flight director 82 (FIG. 1) is engaged, there will be a flight director engaged signal on the line 83 (FIG. 3). This, together with the yaw trim engage signal on the line 102, will cause an AND circuit 154 to set a bistable device 155 and provide a disengage heading hold signal on a line 156. In FIG. 2, the disengage heading hold signal on the line 156 will operate a relay coil 157 so as to open the normally closed contact 138, thereby causing the feet off pedal switches signal on the line 141 to disappear. Therefore, if the flight director is engaged and the aircraft is flying below 60 knots, there will be no input to the OR circuit 148 (FIG. 3) so the AND circuit 147 will no longer provide the trim engage signal on the line 102 and therefore the yaw outer loop trim system (bottom of FIG. 2) becomes inoperative. This is permissible because the flight director is steering with roll, and below 60 knots no automatic turn coordination is required. Of course, if coordination of flight director induced rolls were desired at a lower speed, accommodation could be made therefor in a straightforward fashion. If the flight director should become disengaged for some reason during a coordinated turn, the usual provision would cause the aircraft to slowly roll back to a wings level situation. But this would leave the turn uncoordinated until wings level were achieved, due to the absence of the signal on the line 83 (FIG. 3) causing the absence of the signal on the line 156, which in turn (FIG. 2) causes the presence of the feet off pedal switches signal on the line 141 so that the inverter 152 (FIG. 3) will terminate the coordinated turn signal on the line 124. In order to avoid sideslip as a consequence of the flight director becoming disengaged during a coordinated turn without pilot intervention, the bistable device 155 is not allowed to be reset upon disengagement of the flight director until the aircraft has rolled back to nearly a wings level situation. Thus, the absence of the flight director engage signal on the line 83 will cause an inverter 160 to enable an AND circuit 161 to respond to a less than ±2.5° signal on a line 162 from a window comparator 163 having plus and minus reference voltages therein equivalent to 2.5° of roll. When the vertical gyro roll axis provides a roll attitude signal on the line 166 which is less than ±2½° of roll, then the signal on the line 162 can cause the AND circuit 161 to provide a signal to an OR circuit 164 which will reset the bistable device 155, thereby ending the signal on the line 156 and allowing the yaw trim system to go out of the coordinated turn mode and into the heading hold mode as described hereinbefore. The bistable 155 is also reset in response to the yaw trim on reset signal on the line 144.

The yaw outer loop trim system can automatically be shut down by setting of the bistable device 145 (upper right FIG. 3) whenever certain conditions are indicated as being faulty. In FIG. 2, the magnitude of the yaw trim error signal current on the line 104 is indicated by a signal on a line 166a which may be picked off at a suitable point within the amplifier 105 (developed across a small resistor in series, or high resistor in parallel, in a well known way). In FIG. 3, the yaw servo current signal on the line 166a is applied to a window comparator 167 which has plus and minus voltages therein equal to the maximum current in either direction which the yaw servo amplifier is to provide to the electromagnetic valve 93 (FIG. 2) when the trim system is operating properly. An excessive current will cause the window comparator 167 to provide a signal on a line 168 to operate an OR circuit 169. The OR circuit 169 is also responsive to a signal on a line 170 from a window comparator 171 that is responsive to a rate of change of position signal on a line 172 developed by a differentiating amplifier 173 in response to the yaw outer loop position signal on the line 107. If the servo has a typical hydraulic hard-over failure, the servo will drive rapidly to one end or the other of its capability, and this rapid change in position will cause a sufficient signal on the line 172 so that the window comparator will sense that the signal exceeds that represented by either the plus or minus reference voltages, so as to provide the signal on the line 170. A signal out of the OR circuit 169 on a line 174 is conditionally indicative of a fault in the trim system. If the signal lasts for a sufficient period of time, it is deemed to be a fault; but if the signal disappears in a short time (such as in less than six seconds), it is representative of some transient condition which does not merit shutting down the trim system. The signal on the line 174 will gate an AND circuit 175 so as to allow signals from a clock 176 to advance the count of a resettable counter 177. When the counter reaches a terminal count, it will provide a signal on a line 178 which will cause an OR circuit 179 to set the shutdown bistable device 145 and provide the yaw outer loop shutdown signal on a line 180. This is utilized (bottom of FIG. 2) to cause an inverter 181 to cease providing current to a relay coil 182 so that the normally open contact 106 will become open and thereby prevent any further driving of the piston 90. In FIG. 3, when the signal on the line 174 disappears, an inverter 184 will cause an OR circuit 185 to reset the counter 177. As before described, if the signal on the line 174 results from a transient condition, the OR circuit 185 may reset the counter 177 before it times out (in about six seconds); this will avoid shutting down the yaw outer loop. The OR circuit 185 is also operable to reset the counter 177 in response to the yaw trim on reset signal on a line 144.

As described fully in the aforementioned Fischer application, if the roll outer loop (FIG. 1) is shut down, as indicated by the roll outer loop signal on the line 42, this means that there will no longer be any recentering of the roll actuators, so that the authority of the automatic flight control system in the roll channel will be limited to ±5% of full roll authority. In such a case, the actual roll attitude will (instantaneously) remain the same as it was when the roll outer loop was shut down, with possible small variations due to the roll inner loop. It therefore becomes prudent not to have the yaw trim system operable because the pilot will take over the yaw function once he achieves a shutdown indication (as described hereinafter). Particularly, the coordinated turn function of the yaw trim system could disrupt the pilot's recovery of aircraft control should the roll outer loop shut down. For that reason, the roll outer loop shutdown signal on the line 42 is also fed to the OR circuit 179 (FIG. 3) to thereby set the bistable device 145 and provide the yaw outer loop shutdown signal on the line 180. When the yaw outer loop shutdown signal appears on the line 180, it can cause an OR circuit 190 to operate a trim shutdown indicator 191 which advises the pilot of the fact that one or more of the three axes trim systems (pitch, roll or yaw) has been automatically shut down. The OR circuit 190 is also operated by the roll outer loop shutdown signal on the line 42. And, it can be operated by a pitch outer loop shutdown signal on a line 42P (developed in the same fashion as the roll outer loop shutdown signal on the line 42, as described in the afore-mentioned Fischer et al application). The use of a single indicator 191 to indicate that one of the three trim axes has automatically shut down saves cockpit space, and can save complex wiring and the shielding thereof. However, it poses a problem in determining which of the trim axes has shut down. A further problem is that the pitch outer loop and roll outer loop are typically operated on a cyclic trim system switch, together. That is, both of them are turned on together, or not. As indicated in the aforementioned Fischer et al application, the shutdown function in the pitch and roll axes may be registered by a bistable device similar to the bistable device 145, which is reset for a half-second by a single shot similar to the single shot 143, whenever the cyclic trim switch is cycled off and back on again. Because the roll outer loop shutdown is coupled into the yaw outer loop shutdown through the OR circuit 179, the faulty axis can be isolated. This is achieved by first cycling the yaw trim on switch 136 (FIG. 2) first off and then on again. This causes the signal on the line 137 to disappear and then to reappear. In turn, the single shot 143 (FIG. 3) will provide a half-second pulse to the bistable 145. Because the bistable 145 is reset, it will turn off for one half-second regardless of which signal (line 42 or line 178) caused the OR circuit 179 to set the bistable. If, then, when the yaw trim switch is cycled, there is a half-second interruption in the illumination of the trim shutdown indicator 191, this means that the signal on the line 180 is the only signal present at the input of the OR circuit 190, indicating that the yaw trim axis is the one which has automatically shut down. But if the trim shutdown indicator 191 does not go dark for a half-second when the yaw trim on switch is cycled, it could be because there is a signal on the line 42 or a signal on the line 42P at the input of the OR circuit 190. If then the cyclic trim switch is cycled, first off and then on again, and the trim shutdown indicator 191 does not go dark for one half second, this means that the yaw outer loop shutdown signal on the line 180 is present at the OR circuit 190. Having previously determined, by momentarily resetting the bistable 145, that absence of the signal on the line 180 will not turn off the trim shutdown indicator, it is now known that the roll trim system is the one at fault. When yaw is shut down the signal on the line 42 maintains the indicator turned on, and when both pitch and roll are shut down (yaw being left on), the roll shutdown is registered in the bistable 145 during the shutdown of the pitch and roll channel, so the signal on the line 180 remains present. But if when the cyclic trim on switch is turned off and back on again, the trim shutdown indicator 191 goes dark for one half second, that can only occur because the pitch outer loop shutdown signal is present on the line 42P.

Referring again to FIG. 2, the yaw inner loop is basically conventional, and is described only for completeness of the system in which the present invention may be practiced. The yaw inner loop actuator 87 is driven by an amplifier 200, the input of which is provided by a summing junction 201. A principal input to the summing junction 201 is a signal on a line 202 indicating the position of the yaw inner loop actuator 87 as determined by a position sensor 203. Thus, the summing junction 201 provides closed loop servo control over the inner loop actuator 87, driving it to the point where the remaining commands provided to the summing junction 201 are equal to the position on line 202 so that no further command is provided to the actuator 87 by the amplifier 200.

The summing junction 201 responds to various functions of yaw rate in dependence upon airspeed, pedal force, and yaw rate itself, and during coordinated turns is also responsive to lateral acceleration, roll rate and yaw rate.

Specifically, the yaw inner loop has the principal function of providing yaw stability against short term disturbances (such as may be caused by gusts or abrupt pilot inputs). When the aircraft is flying below 60 knots, the absence of the airspeed greater than 60 knots signal on the line 150 will cause an inverter 204 to command a fade circuit 205 to fade out and to command a fade circuit 206 to fade in. This will cause an amplifier 207 to provide proportional yaw rate to the summing junction 201. Except in the case when the pilot is applying heavy pedal force, or has just ceased to do so, a fade circuit 208 will have been faded in, so that a lag amplifier 209 provides additional, delayed stability through either of two amplifiers 210, 211 and a 3.6% limiter 213. This depends upon whether a relay contact 214 is in the normally closed position (as shown) during low airspeeds, or transfers to the normally open position by virtue of the airspeed greater than 60 knots signal on the line 150 energizing a relay coil 216. When the airspeed is greater than 60 knots, a higher gain is used to provide additional stability. In order to avoid saturation of the yaw inner loop as a consequence of high yaw rates incurred during turns at high airspeeds, whenever the airspeed signal is present on the line 150, the fade circuit 206 will receive a command to fade out and fade circuit 205 will receive a command to fade in. This eliminates the proportional jaw rate input to the summing junction 201 from the amplifier 207 and substitutes, in its place, a washed out yaw rate input from a lagged rate amplifier (washout) 218.

Whenever sufficient pedal force is applied to actuate the switch 96, the pedal force signal on the line 97 will provide a command to the fade circuit 208 to cause it to fade out, thereby eliminating the lagged rate input from the lag amplifier 209 to the summing junction 201. Because heavy force results in a high yaw rate input to the inner loop, this would cause the limiter 213 to be saturated, and subtract authority which could otherwise be provided by other inputs to the summing junction 201. Thus, eliminating the lag input restores 3.6% of authority to the inner loop during heavy pilot input. Once faded out, the circuit 208 will remain out until an AND circuit 219 is operated by an inverter 220, indicating that the pedal force signal is no longer present on the line 97, and by a compare circuit 221 providing an output indicating that the yaw rate has fallen to some low value following the high pilot input maneuver.

In coordinated turns, the presence of the coordinated turn signal on the line 124 can operate a switch 224 to provide inputs from an amplifier 225 to the summing junction 201. The amplifier 225 is responsive to a summing junction 226 which receives washed out yaw rate from the lagged rate amplifier 218. This provides washed out yaw rate for additional short term stability during coordinated turns.

For additional gain in the yaw channel during coordinated turns, the summing junction 226 also receives the filtered lateral acceleration signal on the line 126 and receives an input from an amplifier 227 that is responsive to the roll rate signal on the line 52. This provides faster response to variations in roll and yaw during coordinated turns, which avoids oscillation about the coordination point which might result from utilizing only the slower outer loop trim system.

The present invention, extending roll rate to accommodate buildup of integrated lateral acceleration, is implemented in the present invention by means of the lag amplifier 131 (FIG. 2). This allows near-perfect coordination of turns, from the point of initiation to the point where the integrator 114 has built up a sufficient output signal to provide zero lateral acceleration. The invention avoids any necessity to increase the gain of the integrator 114 beyond that which provides the desired response, and avoids any necessity to increase the gain of the amplifier 129 to the point where the turn is coordinated fully by proportional lateral acceleration, after the roll rate has gone to nil, and before the amplifier 114 has built up a sufficient output. Avoidance of an excessive gain in the amplifier 129 results in a smoother, less bumpy ride since any perturbations in the yaw axis (e.g., as a consequence of wind gusts) or in the roll angle (which may be as a consequence of pilot input) could, with a high proportional lateral acceleration input, cause a bumpy and disturbing ride during the turn.

The foregoing description is in simplified block form, the detailed circuitry being described with respect to simple positive logic utilizing either relay contacts or switches to open and close certain paths, summing junctions (which are understood to be combinations of resistors at the correct inverting and noninverting inputs of suitable amplifiers) single shots which may require reset dominance or may not need one, bistable devices, and the like. Many of the foregoing functions can obviously be achieved in a simpler fashion by using more true and complement outputs and fewer inverters; in many instances the positive logic disclosed may readily be reworked into inverting logic to be more suitably applicable to available hardware chips. The description is, therefore, principally in terms of function achieving blocks, and it should be understood that numerous variations may be utilized for achieving the same or equivalent functions and combinations of functions within the skill of the art. In addition, the functions of the foregoing apparatus (other than the mechanical functions and those functions which directly interface with the mechanical functions) may readily be implemented by utilization of a suitably programmed digital computer. The conversion of the discrete and analog functions described herein to digital functions performed by suitable software in a computer is well within the skill of the art, particularly in the light of the teachings of equivalency set forth in a commonly owned copending U.S. patent application, Ser. No. 176,832, filed on Aug. 8, 1980 by Clelford et al.

The invention may be practiced in automatic flight control systems having single channels of inner loop or of outer loop, dual channels of inner loop or of outer loop, or more channels of either, in various combinations. The exemplary conditions, magnitudes, durations and relationships may of course be varied to suit any usage of the invention. Aspects of the invention may be practiced in automatic control of various functions, in addition to the illustrative functions described herein.

Similarly, although the invention has been shown and described with respect to an exemplary embodiment thereof, it should be understood by those skilled in the art that the foregoing and various other changes, omissions and additions may be made therein and thereto, without departing from the spirit and the scope of the invention.

We claim:

1. A yaw trim channel of an aircraft automatic flight control system that positions the yaw-axis-controlling aerodynamic surfaces of the aircraft, comprising:
   rate means for providing a roll rate signal indicative of roll rate of the aircraft;
   acceleration means for providing a lateral acceleration signal indicative of lateral acceleration of the aircraft;
   yaw trim actuator means responsive to a command input signal thereto for positioning said aerodynamic surfaces; and
   signal processing means responsive to said rate means and said acceleration means for providing a yaw command signal to said actuator means in response to a proportional function of said lateral acceleration signal, an integral function of said lateral acceleration signal, and a proportional function of said roll rate signal;

characterized by said signal processing means comprising means for providing said yaw command signal in response to a lagged function of said roll rate signal.

2. A yaw trim channel according to claim 1 wherein said signal processing means provides said yaw command signal in response to a lagged function of said roll rate signal having a time constant of several seconds.

* * * * *